(12) United States Patent
Suzuki et al.

(10) Patent No.: US 11,493,430 B2
(45) Date of Patent: Nov. 8, 2022

(54) AUTOMATIC ANALYZER AND OPTICAL MEASUREMENT METHOD

(71) Applicant: Hitachi High-Tech Corporation, Tokyo (JP)

(72) Inventors: Kosuke Suzuki, Tokyo (JP); Fujio Onishi, Tokyo (JP); Hidetsugu Tanoue, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 31 days.

(21) Appl. No.: 17/267,130

(22) PCT Filed: Aug. 13, 2019

(86) PCT No.: PCT/JP2019/031829
§ 371 (c)(1),
(2) Date: Feb. 9, 2021

(87) PCT Pub. No.: WO2020/039997
PCT Pub. Date: Feb. 27, 2020

(65) Prior Publication Data
US 2021/0310933 A1    Oct. 7, 2021

(30) Foreign Application Priority Data
Aug. 22, 2018    (JP) .............................. JP2018-155111

(51) Int. Cl.
*G01N 21/00*    (2006.01)
*G01N 21/01*    (2006.01)
(Continued)

(52) U.S. Cl.
CPC ....... *G01N 21/01* (2013.01); *G01N 35/00584* (2013.01); *G01N 2021/0118* (2013.01);
(Continued)

(58) Field of Classification Search
CPC ............ G01N 21/01; G01N 35/00584; G01N 2021/0118; G01N 2035/00851;
(Continued)

(56) References Cited

U.S. PATENT DOCUMENTS 5,677,536 A    10/1997    Vickers
7,157,681 B1    1/2007    Tetzlaff
(Continued)

FOREIGN PATENT DOCUMENTS

| JP | H01318988 A | 12/1989 |
|---|---|---|
| JP | 2017151052 A | 8/2017 |
| WO | 2017126170 A1 | 7/2017 |

OTHER PUBLICATIONS

Search Report dated Nov. 12, 2019 in corresponding International Application PCT/JP2019/031829.
(Continued)

*Primary Examiner* — Md M Rahman
(74) *Attorney, Agent, or Firm* — Miles & Stockbridge, P.C.

(57) ABSTRACT

Provided are an automatic analyzer and an optical measurement method for correcting a variation in the multiplication factor of a photoelectric element with high accuracy. The automatic analyzer comprises: a photoelectric element which generates electrons by light and outputs a current signal; a voltage application unit which applies a voltage to the photoelectric element; and a processing unit which corrects a variation in the multiplication factor of the photoelectric element, wherein the photoelectric element outputs a pulse signal as the current signal, and the processing unit corrects the variation in the multiplication factor on the basis of the pulse area of the pulse signal.

12 Claims, 10 Drawing Sheets

(51) Int. Cl.
  *G01N 35/00* (2006.01)
  *G01N 35/10* (2006.01)
(52) U.S. Cl.
  CPC .............. *G01N 2035/00851* (2013.01); *G01N 2035/00891* (2013.01); *G01N 2035/1048* (2013.01)
(58) Field of Classification Search
  CPC . G01N 2035/00891; G01N 2035/1048; G01N 21/645; G01N 2201/127; G01N 35/1095; G01J 1/42; G01J 2001/444; G01J 3/027; G01J 3/0297; H01J 43/30
  USPC .......................................................... 356/72
  See application file for complete search history.

(56) References Cited

U.S. PATENT DOCUMENTS

| | | |
|---|---|---|
| 10,942,108 B2 | 3/2021 | Tahara |
| 2006/0163454 A1* | 7/2006 | Akiba .................... H01L 31/028 250/214 R |
| 2007/0034781 A1* | 2/2007 | Akiba .................... H01L 31/028 250/214 R |
| 2011/0031405 A1 | 2/2011 | Kulik et al. |
| 2013/0234923 A1* | 9/2013 | Machida ................. G09G 3/344 345/107 |
| 2015/0153223 A1 | 6/2015 | Onishi et al. |
| 2015/0268361 A1* | 9/2015 | Atsuta .................... G01T 1/2018 250/361 R |
| 2017/0248464 A1 | 8/2017 | Kimura et al. |

OTHER PUBLICATIONS

Written Opinion dated Nov. 12, 2019 in corresponding International Application PCT/JP2019/031829.

Search Report dated Apr. 11, 2022 in European Application No. 19852218.7.

* cited by examiner

AUTOMATIC ANALYZER AND OPTICAL MEASUREMENT METHOD

TECHNICAL FIELD

The present invention relates to an automatic analyzer and an optical measurement method.

BACKGROUND ART

A photoelectric element, such as a photomultiplier tube (PMT) and a photodiode, can extract weak light in a form of a current signal and is thus used as a photodetector in various fields. The photoelectric element is used in, for example, an automatic analyzer, which detects light from a luminescent reagent that emits light in the presence of a specimen such as blood and measures components of the specimen.

In PMT, an electron multiplication factor or a gain is known to fluctuate with time. There has been disclosed a technique to correct fluctuation in the multiplication factor (see patent literature 1).

Citation List

Patent Literature

Patent literature 1: Japanese Unexamined Patent Application Publication No. 2017-151052.

SUMMARY OF INVENTION

Technical Problem

The radiation detector described in the patent literature 1 employs a method for quantizing a pulse signal into a digital signal of 0 or 1 through comparison between wave height of the pulse signal and a threshold, and counting the number of the converted digital signals of 1 and the number of the converted digital signals of 0. Hence, pulses having the same wave height but different widths, i.e., pulses having different energy amounts are quantized as pulses having the same energy amount, which makes it difficult to accurately correct the multiplication factor.

It is therefore an object of the invention to provide an automatic analyzer and an optical measurement method, which accurately corrects fluctuation in a multiplication factor of a photoelectric element.

Solution to Problem

An automatic analyzer of one embodiment of the invention includes a photoelectric element that generates electrons from light and outputs a current signal, a voltage applying unit that applies a voltage to the photoelectric element, and a processing unit that corrects fluctuation in a multiplication factor of the photoelectric element, where the photoelectric element outputs a pulsed signal as the current signal, and the processing unit corrects the fluctuation in the multiplication factor based on pulse area of the pulsed signal.

Advantageous Effects of Invention

According to the invention, fluctuation in a multiplication factor of a photoelectric element can be accurately corrected.

DESCRIPTION OF EMBODIMENTS

Some embodiments will now be described with reference to drawings.

Figure 1:
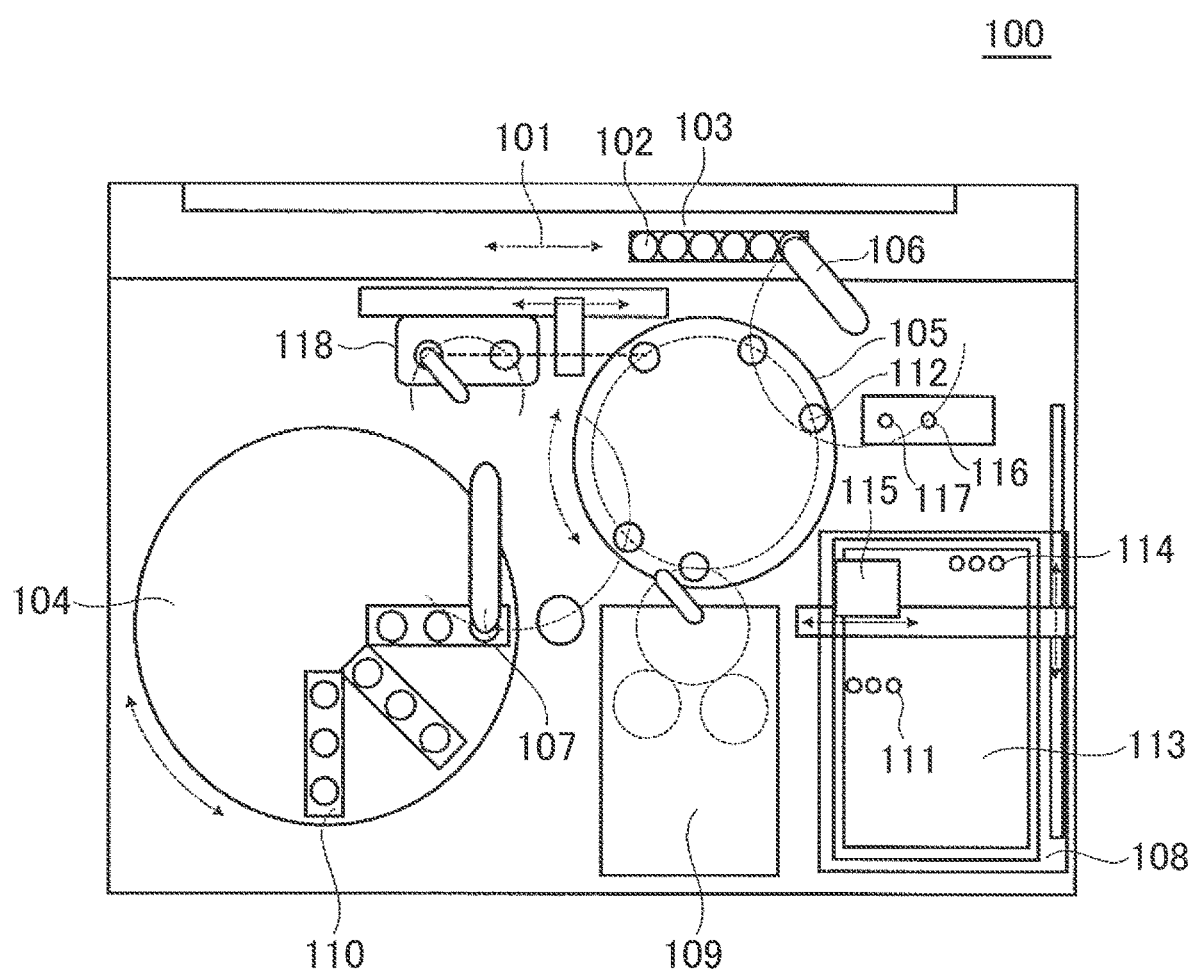
FIG. 1 is a configuration diagram of an automatic analyzer 100.

FIG. 1 is a configuration diagram illustrating a configuration of an automatic analyzer 100. The automatic analyzer 100 includes a first transport unit 101 that transports a specimen rack 103 accommodating a plurality of specimen containers 102, a reagent holder 104 holding reagent containers 110, an incubator 105 that holds respective reaction containers 111 being warmed at a plurality of holding positions 112, a specimen dispensing unit 106 that dispenses a specimen from the specimen container 102 into the reaction container 111 on the incubator 105, a reagent dispensing unit 107 that dispenses a reagent within the reagent container 110 from the reagent holder 104 into the reaction container 111 on the incubator 105, a magazine 108 that holds an accommodating unit 113 accommodating chips 114 to be used for specimen dispensing and the reaction containers 111, a chip supply position 116 to supply the chips 114 to the specimen dispensing unit 106, a disposal hole 117 to dispose used chips 114, a second transport unit 115 that transports the chips 114 and the reaction containers 111 between the magazine 108, the specimen dispensing unit 106, the chip supply position 116, the disposal hole 117, and the incubator 105, a B/F separation unit 118 that removes measurement obstructing components contained in the specimen by washing with a B/F separation liquid, and the measurement unit 109 that measures a light signal or an electric signal corelating with the amount of an analysis object component.

First Embodiment

Figure 2:
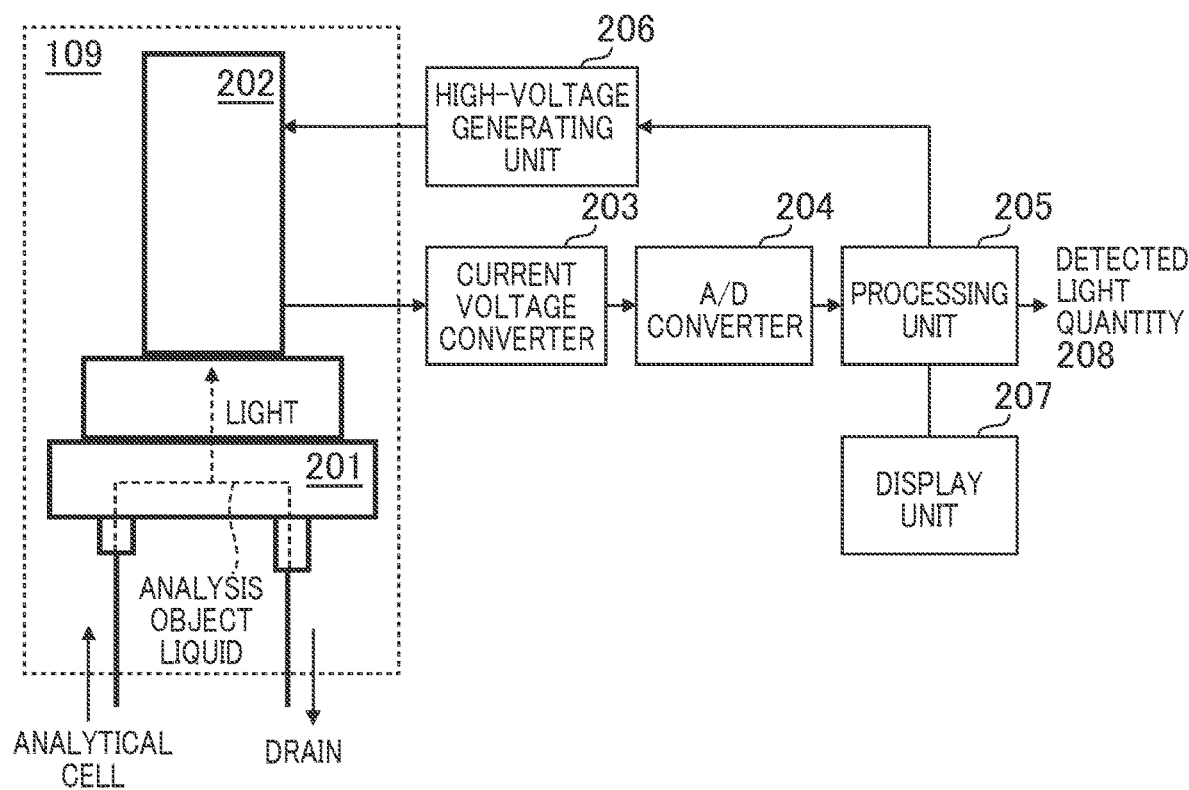
FIG. 2 illustrates a measurement unit 109 and the periphery of the measurement unit 109.

FIG. 2 illustrates the measurement unit 109 and the periphery of the measurement unit 109. The measurement unit 109 measures the quantity of light emitted by a luminescent reagent to perform qualitative analysis or quantitative analysis of a measuring object substance in a specimen, and includes a light emitting section 201 (light source) that emits light to be measured and the PMT 202 (photoelectric element). In FIG. 2, the light emitting section 201 is shown as a flow cell detector. Specifically, for example, fluorescent emission of an emission labeling reagent contained in an analysis object liquid introduced from an analytical cell (the reaction container 111 accommodating the reagent and the specimen) is used as light emission of the light emitting section 201. The measured liquid is drained into an outlet. The light emission of the light emitting section 201 may include light emitted from the luminescent reagent during washing of the flow cell detector. Alternatively, a light source using a light emitting element such as LED may be separately provided.

A current voltage converter 203, an A/D converter 204, a processing unit 205 that processes data and outputs the detected light quantity 208, a high-voltage generating unit 206 (voltage application unit), and a display unit 207 are provided in the periphery of the measurement unit 109. The measurement unit 109 may not be the flow cell detector, but may measure the quantity of transmitted light or scattered light caused by irradiating the analytical cell with light.

The PMT 202 includes a photoelectric surface that generates electrons from photons injected from the light emitting section 201, and a multiplier section (not shown) that multiplies the electrons from the photoelectric surface and outputs a current signal corresponding to the quantity of incident light. The multiplier section multiplies the electrons in accordance with a multiplication factor corresponding to the voltage applied from the high-voltage generating unit 206.

Figure 3:
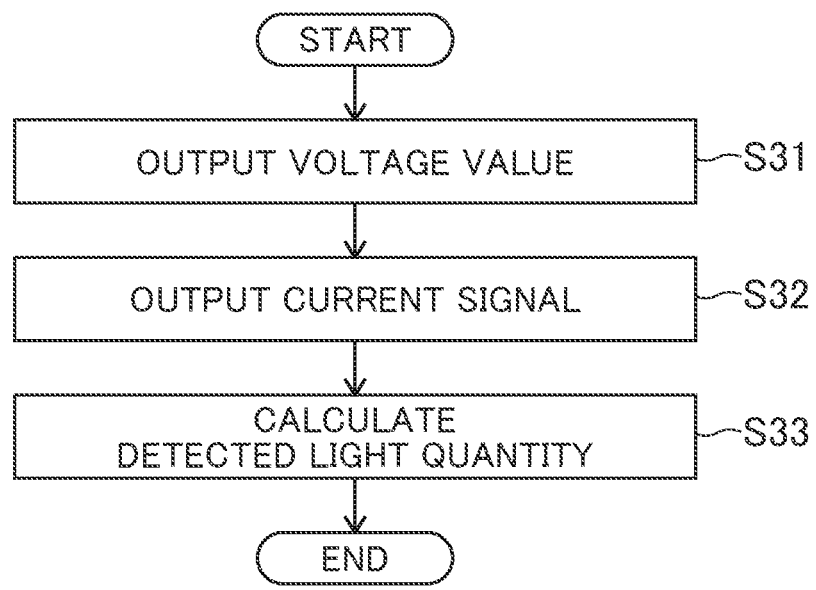
FIG. 3 is a flowchart for calculating detected light quantity 208.

FIG. 3 is a flowchart for calculating the detected light quantity 208. In step 31 (hereinafter, mentioned as "S31"), the processing unit 205 sets a voltage value to be a standard value determined for each PMT 202, and outputs the voltage value to the high-voltage generating unit 206. The high-voltage generating unit 206 applies a voltage to the PMT 202 in accordance with the voltage value.

Subsequently, the light emitting section 201 irradiates the PMT 202 with light. The PMT 202 converts the light into electrons, and multiplies the electrons with a multiplication factor determined according to the applied voltage and outputs a current signal to the current voltage converter 203 (S32). The current voltage converter 203 converts the current signal into a voltage signal, and the A/D converter 204 converts the voltage signal into a digital signal and outputs the digital signal to the processing unit 205.

Subsequently, the processing unit 205 calculates, based on the digital signal, the quantity of light (detected light quantity 208) emitted by the light emitting section 201.

Figure 4:
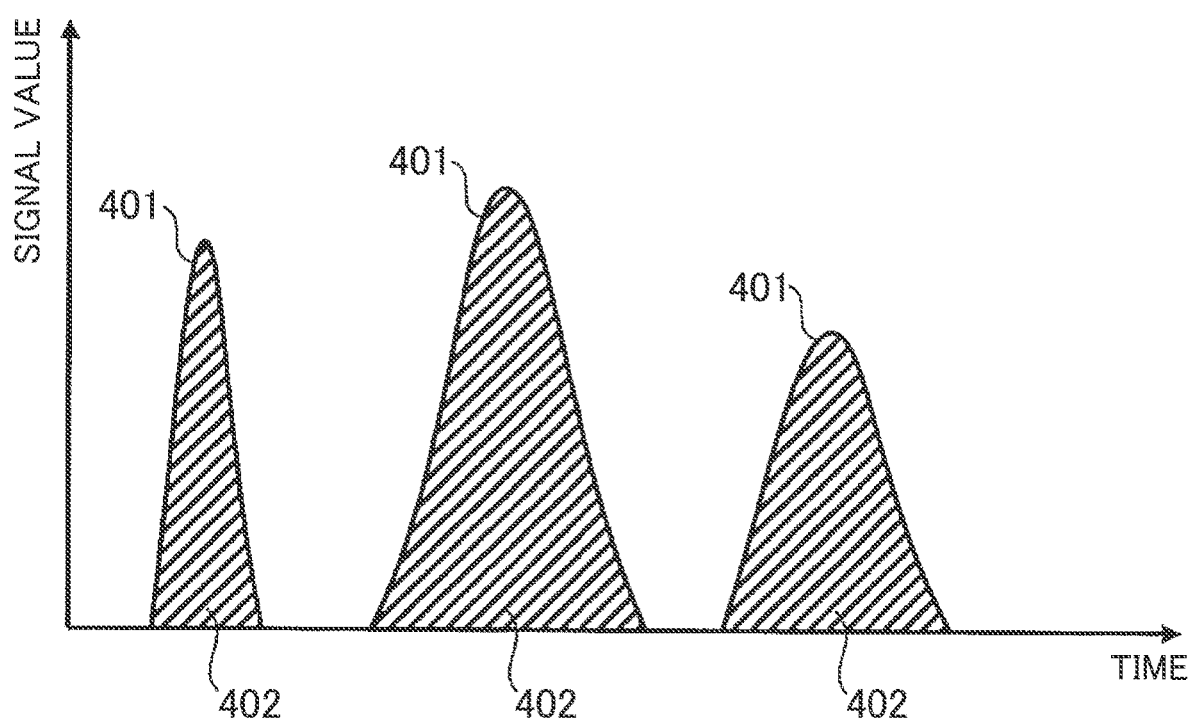
FIG. 4 illustrates light detection time and a signal value of PMT 202.

FIG. 4 illustrates light detection time and a signal value of the PMT 202. In case of a small quantity of incident light from the light emitting section 201, the current signal output by the PMT 202 becomes a pulsed signal 401. Herein, "pulsed signal" means an output signal generated through conversion from photons to electrons by a photoelectric effect, and its minimum unit corresponds to a pulse signal per photon.

Even if no light is incident from the light emitting section 201, electrons may be thermally generated with a certain probability from a photoelectric surface and be multiplied, causing output of dark current. In such a case, the current signal output by the PMT 202 also becomes the pulsed signal 401.

When the quantity of incident light from the light emitting section 201 or the multiplication factor of the PMT 202 increases, the current signals being output overlap one another, and the pulses cannot be identified. Hence, the quantity of incident light causing the current signal to be the pulsed signal 401 is set to the extent that the individual pulses can be identified in correspondence to an estimated multiplication factor of the PMT 202, for example. In a graph with time as a horizontal axis and a signal value as a vertical axis, each pulsed signal 401 has a pulse area 402.

The current voltage converter 203 converts the current signal received from a multiplication section of the PMT 202 into the voltage signal, and sends the voltage signal to the A/D converter 204. The current voltage converter 203 includes components such as an operational amplifier, a feedback resistance for current voltage conversion, a capacitor for setting a frequency band, and a differential amplifier circuit. The frequency band is set such that when the current signal received by the current voltage converter 203 is the pulsed signal 401, the voltage signal sent from the current voltage converter 203 to the A/D converter 204 also becomes the pulsed signal 401.

The A/D converter 204 converts the voltage signal received from the current voltage converter 203 into a digital signal, and sends the digital signal to the processing unit 205. When the current signal output by the PMT 202 is the pulsed signal 401, the digital signal output by the A/D converter 204 also becomes the pulsed signal 401. In such a case, the A/D converter 204 only needs to be set to a sampling time interval and/or a voltage resolution long/small enough for the individual pulsed signals 401 to be identified. In a usable A/D converter 204, for example, a sampling time interval is 4 μs and a minimum voltage resolution is about 0.6 μV.

The processing unit 205 calculates the detected light quantity 208 based on the digital signal received from the A/D converter 204. In addition, the processing unit 205 calculates the pulse area 402 of the pulsed signal 401 based on the received digital signal, calculates a voltage value to be applied to the PMT 202 based on the pulse area 402, and sends the voltage value to the high-voltage generating unit 206. The processing unit 205 corrects the detected light quantity 208 based on the pulse area 402. The processing unit 205 may include a storage section to store various data such as the voltage value and the detected light quantity 208.

The high-voltage generating unit 206 generates a voltage according to the voltage value received from the processing unit 205, and applies the voltage to the PMT 202.

The display unit 207 is configured to be displayable of various data and screens such as a GUI screen for input of user instructions. The display unit 207 may be connected to an input device (not shown) such as a mouse. In addition, the display unit 207 may display a graph showing light detection time and an output current of the PMT 202 as illustrated in FIG. 4.

The detected light quantity needs to be the same for the same quantity of light received by the photoelectric element such as PMT in order to perform accurate measurement. However, an electron multiplication factor of the photoelectric element is known to vary with the lapse of time for application of the same voltage. Specifically, after the lapse of time, the processing unit disadvantageously outputs different detected light quantity even for the same quantity of light received.

As described before, the correction method based on wave height is previously disclosed. However, the inventors have found that energy per photon cannot be accurately expressed only by wave height information. Thus, description is now given on a method for correcting fluctuation in the multiplication factor of the photoelectric element based on the pulse area of the pulsed signal, which is more accurate information than the wave height is, and suppressing influence associated with aged deterioration of the photoelectric element. In the first embodiment, the description is specifically given on a method for correcting the voltage to be applied to the PMT 202 based on the pulse area and a method for correcting the detected light quantity 208 based on the pulse area.

Figure 5:
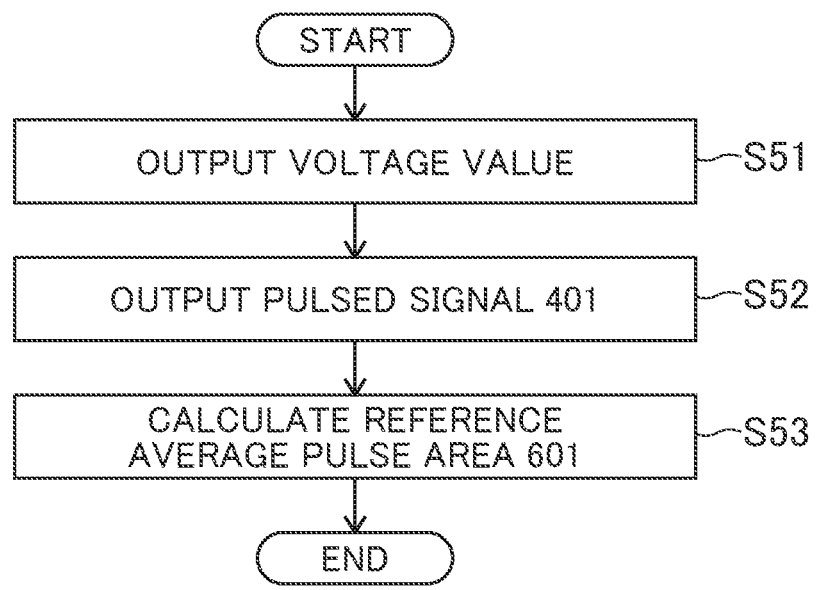
FIG. 5 is a flowchart illustrating a method for calculating reference average pulse area 501 of the PMT 202.

First, description is given on the method for correcting the voltage to be applied to the PMT 202 based on the pulse area. FIG. 5 is a flowchart illustrating a method for calculating reference average pulse area 601 of the PMT 202. The reference average pulse area 601 is calculated as average pulse area to be a reference for correcting a future fluctuation in the multiplication factor while a time point before use of a new PMT 202 is used as a reference time point, for example. The average pulse area is calculated as average of pulse areas within a period long enough to determine pulse area distribution.

In S51, the processing unit 205 sets a voltage value to be a standard value determined for each PMT 202, and outputs the voltage value to the high-voltage generating unit 206. The high-voltage generating unit 206 applies a voltage to the PMT 202 in accordance with the set voltage value. The processing unit 205 stores the voltage value into the storage section.

In S52, the light emitting section 201 emits light such that the current signal output by the PMT 202 becomes the pulsed signal 401. At this time, the light emitting section 201 only needs to emit light the quantity of which is not strictly set but is large enough for the current signal output by the PMT 202 to be the pulsed signal 401. Irradiation with light having the same light quantity results in an output current having the same area regardless of a type of the light emitting section 201.

The dark current may be used instead of emitting light from the light emitting section 201 to allow the current signal output by the PMT 202 to be the pulsed signal 401. In such a case, the light emitting section 201 emits no light in S52. Using the dark current eliminates the need of a light source for calculating the reference average pulse area 601, which eliminates the cost for installation of the light source or eliminates the need of accuracy control of the light source.

In S53, the processing unit 205 calculates pulse areas 402 of a plurality of pulsed signals 401 based on the digital signal output by the A/D converter 204, and calculates the reference average pulse area 601 as the average of the pulse areas 402.

Figure 6:
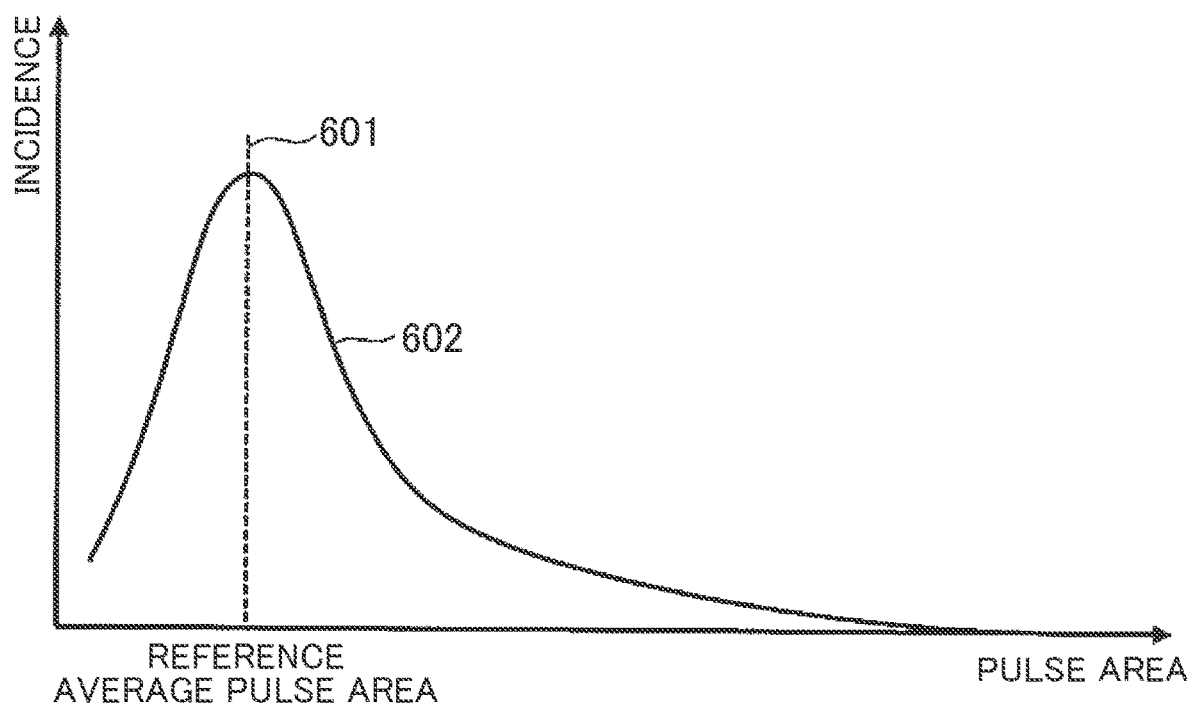
FIG. 6 is a distribution map showing pulse area and incidence of the pulse area.

FIG. 6 is a distribution map showing pulse area and incidence of the pulse area. In the first embodiment, the incidence is defined as "number obtained by dividing the number of pulses having a corresponding area in pulses acquired within a certain time by the number of the pulses acquired within the certain time". Plotting with the pulse area as a horizontal axis against the incidence as a vertical axis results in a distribution map 602 having a peak. For example, a pulse area showing the peak of the distribution map 602 (pulse area of the highest incidence) can be defined as the reference average pulse area 601. The average of the Gaussian distribution may be obtained through Gaussian fitting on the distribution map 602 with the least-squares method and defined as the reference average pulse area 601. Alternatively, a value may be obtained by dividing an integrated value of pulse areas within a certain time by the number of pulses and defined as the reference average pulse area 601. The display unit 207 may display the distribution map 602 or the calculated reference average pulse area 601.

Figure 7:
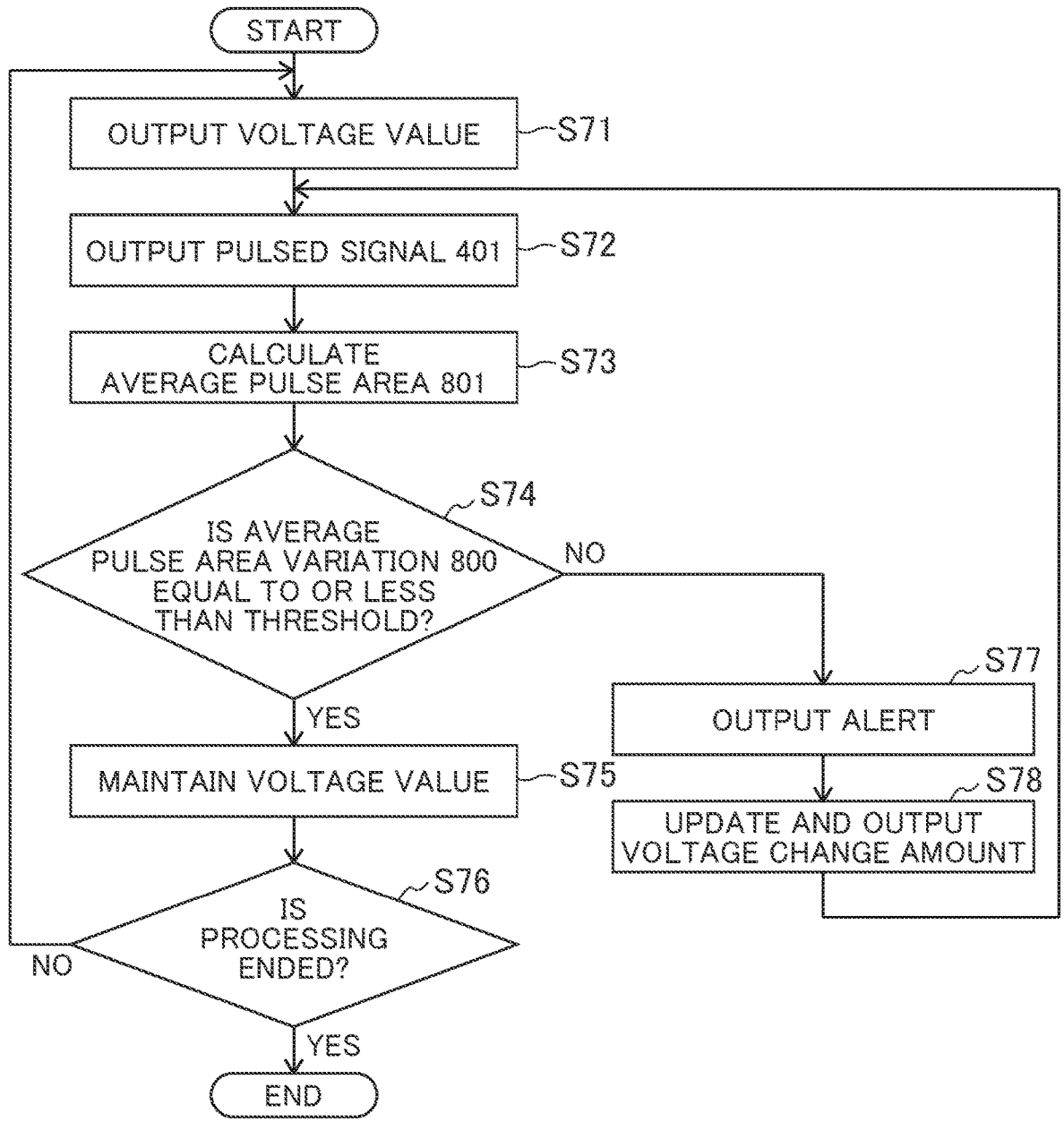
FIG. 7 is a flowchart illustrating a method for controlling a voltage to be applied to the PMT 202.

FIG. 7 is a flowchart illustrating a method for correcting (controlling) the voltage to be applied to the PMT 202. The method illustrated in FIG. 7 is performed to check whether the multiplication factor of the PMT 202 is changed after the lapse of a predetermined period from calculation of the reference average pulse area 601.

S71 to S73 are the same as S51 to S53, respectively. However, while the average pulse area calculated in S53 is average pulse area as a reference (reference average pulse area 601), the average pulse area calculated in S73 is average pulse area 801 after the lapse of the predetermined period from calculation of the reference average pulse area 601. A method for outputting the pulsed signal 401 in S72 may not be the same as that in S52. A method for calculating the average pulse area 801 in S73 also may not be the same as that in S53.

In S74, the processing unit 205 determines whether average pulse area variation amount 800 is equal to or less than a predetermined threshold. The predetermined threshold can be appropriately set depending on conditions such as a specification of an automatic analyzer to be used, analytical content, and a luminescent reagent type.

Figure 8:
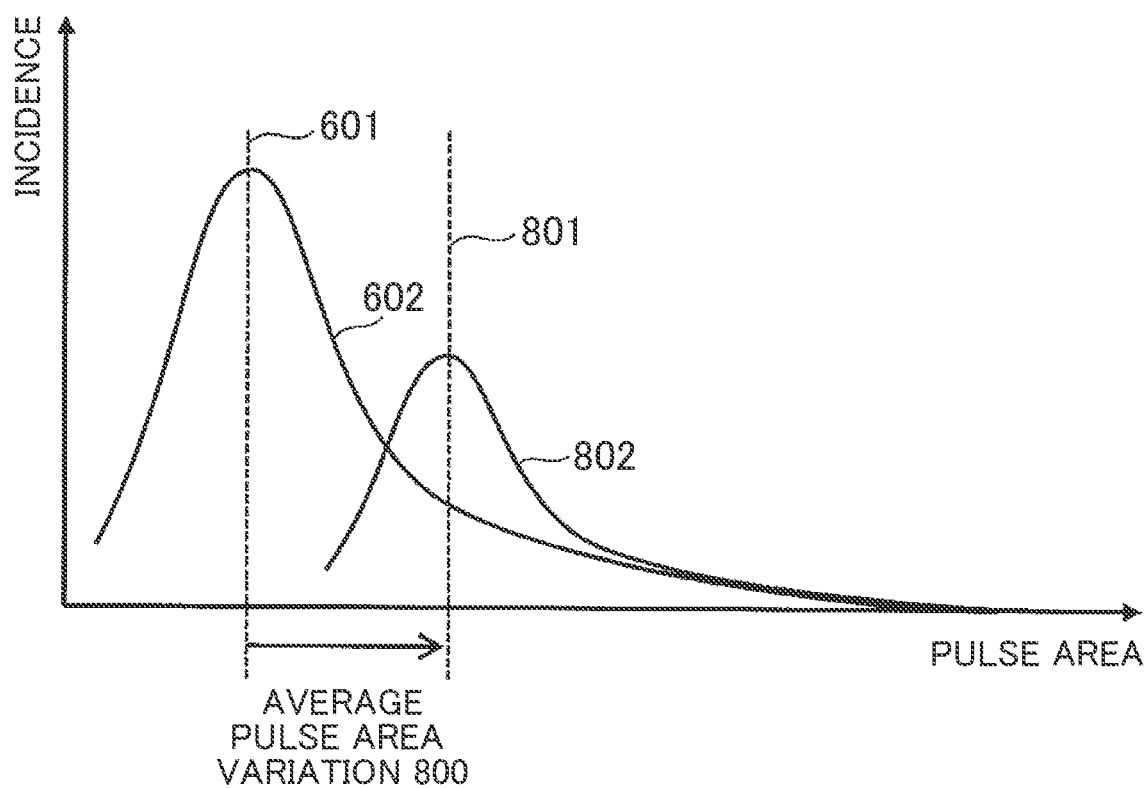
FIG. 8 illustrates a change in the distribution map showing pulse area and incidence of the pulse area.

FIG. 8 illustrates a change in the distribution map showing pulse area and incidence of the pulse area. Fluctuation in the multiplication factor of the PMT 202 causes a difference between the reference average pulse area 601 calculated in S53 and the average pulse area 801 calculated in S73. The processing unit 205 calculates the difference as the average pulse area variation amount 800. The average pulse area variation amount 800 is considered to be proportional to fluctuation in the multiplication factor of the PMT 202. Hence, when the multiplication factor of the PMT 202 increases, the distribution map showing pulse area and incidence of the pulse area shifts right, and the average pulse area variation amount 800 has a positive value. The display unit 207 may display a relationship between the distribution map 602 and the distribution map 802 or may display the average pulse area variation amount 800.

When the average pulse area variation amount 800 is equal to or less than a predetermined threshold (YES in S74), the same value as the voltage value set in S71 is determined as the voltage value concerned (the voltage value is maintained) (S75).

When the average pulse area variation amount 800 is larger than the predetermined threshold (NO in S74), the processing unit 205 outputs an alert (S77). The processing unit 205 can output the alert, such as, for example, an alert indicating that the average pulse area variation amount 800 exceeds the predetermined threshold, an alert recommending replacement of the PMT 202, and an alert informing that the procedure is passed to S78 so that the voltage value is changed. The display unit 207 may display the alert, or may emit a sound by a speaker. In addition, when the average pulse area variation amount 800 is equal to or less than the predetermined threshold but approaches the predetermined threshold, the processing unit 205 may also output the alert. In such a case, it is also acceptable that the average pulse area variation amount 800 is frequently observed and the display unit 207 displays the course of such observation. When the alert is output, since a user can respond to the alert, the procedure may be ended while being not passed to S78. Furthermore, when the PMT 202 is corrected without manual operation, S77 may be omitted.

After S77 (when S77 is omitted, in case of NO in S74), the processing unit 205 calculates the amount of change in the voltage value based on the average pulse area variation amount 800, updates the voltage value based on the change amount, and outputs the updated voltage value to the high-voltage generating unit 206 (S78). The multiplication factor of the PMT 202 increases with an increase in the voltage value, and decreases with a decrease in the voltage value.

Hence, when the average pulse area variation amount 800 has a positive value, since the multiplication factor probably increases, the voltage value is decreased. Subsequently, the procedure is returned to S72, and a series of processing is repeated.

When the voltage value is maintained in S75, whether the processing involved in PMT 202 is finished is determined (S76). When the processing is not finished, the procedure is returned to S71 and a series of processing is repeated.

Figure 9:
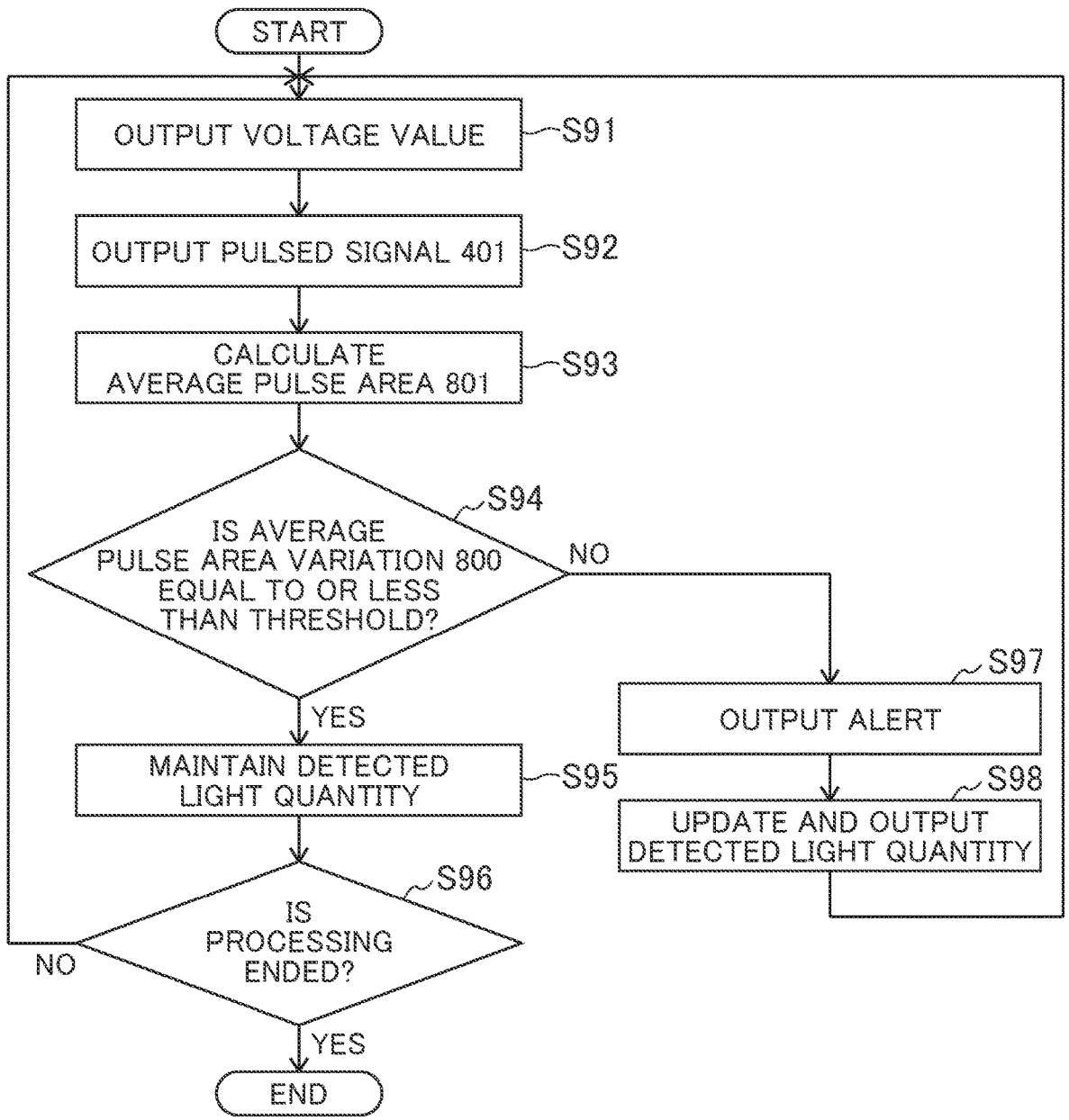
FIG. 9 is a flowchart illustrating a method for correcting the detected light quantity 208.

Description is now given on the method for correcting the detected light quantity 208 based on the pulse area. FIG. 9 is a flowchart illustrating a method for correcting the detected light quantity 208. FIG. 9 is different from FIG. 7 in S95 and S98. The detected light quantity 208 in FIG. 3 has been calculated before S91. In case of YES in S94, the processing unit 205 outputs the detected light quantity 208 without correction (the detected light quantity is maintained). In case of NO in S94, the processing unit 205 corrects the detected light quantity 208 and outputs the corrected, detected light quantity 208.

Second Embodiment

Figure 10:
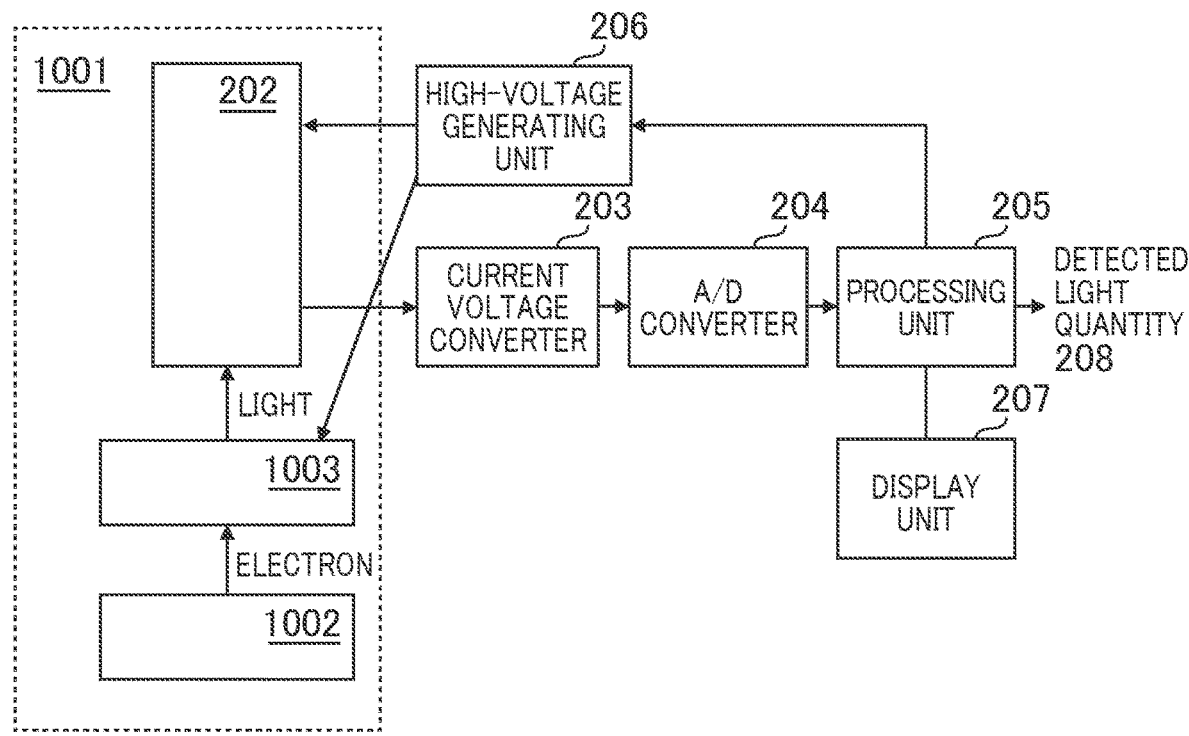
FIG. 10 illustrates a measurement unit 1001 and the periphery of the measurement unit 1001.

Description is now given on a case where the measurement unit 109 shown in FIG. 2 is replaced with a measurement unit 1001 shown in FIG. 10. The measurement unit 1001 is different from the measurement unit 109 in FIG. 2 in including, in place of the light emitting section 201, a mass spectrometry section 1002 that generates electrons and a scintillator 1003 that converts the electrons generated by the mass spectrometry section 1002 into photons. One electron generated by the mass spectrometry section 1002 collides with the scintillator 1003 that then outputs n photons. Such n photons are generated at roughly the same time (in a period of tens to hundreds of nanoseconds). Respective pulses corresponding to the n photons can be observed as one pulsed signal consisting of the plurality of photons by adjusting each of the conversion rates of the PMT 202 and the current voltage converter 203 to a desired value (into a signal amplification band).

Figure 11:
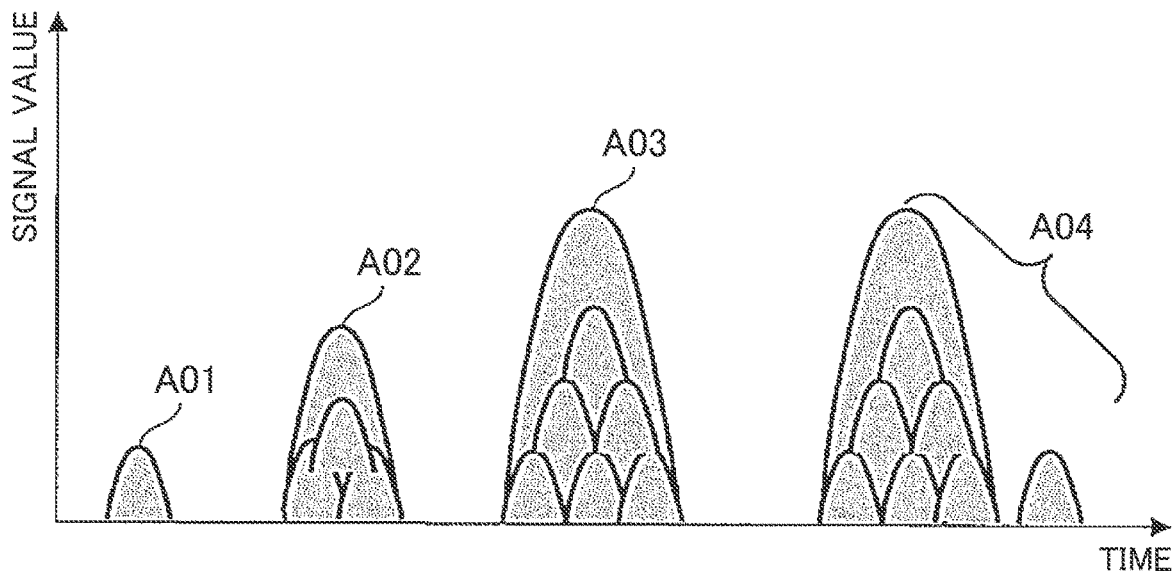
FIG. 11 illustrates light detection time and a signal value of the measurement unit 1001.

FIG. 11 illustrates light detection time and a signal value of the measurement unit 1001. The n photons emitted by the scintillator 1003 become one pulsed signal. Respective pulsed signals corresponding to the n photons normally overlap one another to be in a mass like a pulsed signal A02 or A03. However, since the light emission event of the scintillator 1003 is a probabilistic event, light emission from one electron often results in discrete pulsed signals like pulsed signals A04. Herein, even for the discrete pulsed signals, signals from light emitted within a predetermined time are handled as one pulsed signal. Specifically, respective areas of the discrete pulsed signals are summed and calculated as one pulse area. Consequently, more accurate pulse area distribution can be obtained.

While the scintillator 1003 emits photons from one electron generated by the mass spectrometry section 1002, the number of the photons varies depending on manufacturing tolerances. Such a variation in number results in a variation in machine difference (individual differences between apparatuses) in the number of detected photons. In the second embodiment, the multiplication factor of the PMT 202 is thus corrected such that area of the pulsed signal corresponds to the reference average pulse area in order to reduce such a variation. Although the reference average pulse area is obtained based on the voltage value determined for each PMT 202 in the first embodiment, the reference average pulse area is beforehand experimentally obtained using the mass spectrometry section 1002 in the second embodiment. The procedure of FIG. 7 or FIG. 9 is performed based on the experimentally obtained reference average pulse area.

In the second embodiment, variable voltage may be applied not only to the PMT 202 but also to the scintillator 1003. When the applied voltage to the PMT 202 is variable, pulse area of one detected photon (multiplication factor) can be made variable. When the applied voltage to the scintillator 1003 is variable, the number of photons generated from one electron can be made variable. The respective applied voltages to the PMT 202 and the scintillator 1003 are compositely made variable, which makes it possible to adjust the one pulse area to be the reference average pulse area. There are many variations of a procedure for varying each of the applied voltages to the PMT 202 and the scintillator 1003, and the procedure is not specified.

According to the second embodiment, fluctuation in the multiplication factor of the detected current amount for one electron can be accurately corrected. Although the second embodiment has been described with a case of the mass spectrometry section, any apparatus generating electrons may be used without limitation.

In the configurations of the first and second embodiments, the voltage or the detected light quantity 208 is corrected based on the pulse area having a precise physical quantity, making it possible to accurately correct fluctuation in the multiplication factor of the PMT 202. Using a configuration, in which when the average pulse area variation amount 800 approaches or exceeds the predetermined threshold, an alert is output, makes it possible to awake a user to replacement time of the PMT 202 or the scintillator 1003 or to change in voltage to be applied to the PMT 202 or the scintillator 1003.

Although the current signal output by the PMT 202 is the pulsed signal 401 in the above embodiments, if the voltage of the detected light quantity 208 is not corrected, the current signal need not be the pulsed signal 401.

Although control based on the average pulse area variation amount 800 has been described in the above embodiments, control may be performed based on a ratio of the reference average pulse area 601 to the average pulse area 801, for example, based on a value (variation correction factor) obtained by dividing the average pulse area 801 by the reference average pulse area 601. For example, a value, which is obtained by multiplying the detected light quantity 208 calculated from the digital signal by the variation correction factor, can be used as a correction value of the detected light quantity 208. In such a case, although the variation correction factor is 1 for a new PMT 202, it increasingly becomes larger than 1 with time. Thus, for example, whether the voltage or the detected light quantity 208 is corrected may be determined based on whether the variation correction factor is equal to or lower than the threshold while the predetermined threshold is beforehand set depending on conditions such as a specification of an automatic analyzer to be used, analytical content, and a luminescent reagent type.

Although the above embodiments have been described with a case where a change in threshold of a parameter is continuously monitored and the voltage or the detected light quantity 208 is corrected based on the change in threshold, such monitoring may be temporarily finished when one correction has been finished, and reinitiated for another correction after the lapse of predetermined time. Alternatively, the correction may be performed after the lapse of predetermined time from starting use of the PMT 202 without monitoring change in threshold of the parameter. Alternatively, the voltage or the detected light quantity 208 may be corrected every time depending on the variation amount without using the threshold.

Although the above embodiments have been described with a case where PMT is used as the photoelectric element, any other photoelectric element such as a photodiode may be used. Furthermore, the optical measurement method of the invention is not limitedly applied to the automatic analyzer that detects light emission from a specimen or a luminescent reagent, but may be applied to any apparatus using the photoelectric element such as PMT or a photodiode, including a spectrophotometer, an environment measuring apparatus, and a microscope.

REFERENCE SIGNS

100 Automatic analyzer
201 Light emitting section
202 PMT
203 Current voltage converter
204 A/D converter
205 Processing unit
206 High-voltage generating unit
207 Display unit
208 Detected light quantity
1002 Mass spectrometry section
1003 Scintillator

The invention claimed is:

1. An automatic analyzer, comprising:
a photodetector that generates electrons from light and outputs a current signal;
a voltage generator that applies a voltage to the photoelectric element; and
a processor that corrects fluctuation in a multiplication factor of the photodetector,
wherein the photodetector outputs at least one pulsed signal as the current signal, and
the processor is configured to correct the fluctuation in the multiplication factor based on pulse area of the pulsed signal.

2. The automatic analyzer according to claim 1, wherein the processor is further configured to correct the voltage of the voltage generator based on the pulse area.

3. The automatic analyzer according to claim 1, wherein the processor is further configured to calculate a light quantity based on the current signal, and to correct the light quantity based on the pulse area.

4. The automatic analyzer according to claim 1, wherein the pulse area is calculated based on incidence of each of the pulse areas.

5. The automatic analyzer according to claim 1, wherein the processor is further configured to calculate an average pulse area, and
to correct the fluctuation in the multiplication factor based on a variation amount of the average pulse area from a reference average pulse area.

6. The automatic analyzer according to claim 5, wherein the processor is further configured to correct the fluctuation in the multiplication factor when the variation amount exceeds a predetermined threshold.

7. The automatic analyzer according to claim 1, wherein the pulsed signal is a current signal caused by dark current.

8. The automatic analyzer according to claim 1, wherein the processor is further configured to
calculate an average pulse area,
calculate a correction factor based on a ratio of the average pulse area to a reference average pulse area, and
correct the fluctuation in the multiplication factor based on the correction factor.

9. The automatic analyzer according to claim 8, wherein the processor is further configured to correct the fluctuation in the multiplication factor when variation amount of the correction factor exceeds a predetermined threshold.

10. An optical measurement method, comprising the steps of:
outputting a pulsed signal by a photoelectric element;
calculating area of the pulsed signal; and
correcting fluctuation in a multiplication factor of the photoelectric element based on the area.

11. The method according to claim 10, wherein the step of correcting the fluctuation in the multiplication factor of the photoelectric element corresponds to a step of correcting a voltage to be applied to the photoelectric element based on the area.

12. The method according to claim 10, wherein the step of correcting the fluctuation in the multiplication factor of the photoelectric element corresponds to a step of correcting detected light quantity of the photoelectric element based on the area.

* * * * *